United States Patent Office 3,337,478
Patented Aug. 22, 1967

3,337,478
POLY-3,3-BIS(CHLOROMETHYL)OXETANE CONTAINING ISOCYANATES AS ADHESION IMPROVING AGENTS
Douglas S. Richart, Reading, Pa., assignor to The Polymer Corporation, a corporation of Pennsylvania
No Drawing. Continuation of application Ser. No. 478,414, Aug. 9, 1965. This application Aug. 19, 1966, Ser. No. 573,724
4 Claims. (Cl. 260—2)

This application is a continuation of application Ser. No. 478,414, filed Aug. 9, 1965, now abandoned, which in turn was a divisional application of my co-pending application Ser. No. 218,104, filed Aug. 20, 1962, now abandoned, and relates to improved polymeric materials and, more particularly, to coating materials having improved adhesion to substrates.

The coating materials with which this invention is concerned are the chlorinated polyethers polymerized from 3,3-bis(chloromethyl)oxetane which results in the following molecular structure:

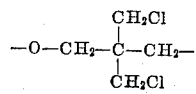

The preparation of this polymer is disclosed in detail, for example, in U.S. Patent 2,722,340, and it is sold under the trademark "Penton" by Hercules Powder Company. These resins have excellent resistance to attack by most corrosive chemicals and organic solvents and are, therefore, useful as coating materials for various processing equipment such as tanks, reaction vessels, pipe lines and the like, where corrosion may be a problem.

Quality coatings for the protection of metal articles from corrosion should be tightly adhered to the article. When coating articles by means of various heat fusion coating processes with the polyether resins with which this invention is concerned, poor maintenance of adhesion under adverse service conditions is generally observed. Conventional primers do not improve the results, probably due to the chemical inertness of the polyether resin. Present methods for providing prolonged adhesion of these resins to the substrate under adverse service conditions usually rely upon mechanical bonding or interlocking as can be achieved by chemically etching or sandblasting the surface of the substrate, but these techniques leave much to be desired.

Accordingly, it is the object of this invention to provide polyether coating resins that will adhere tightly to the substrates to which they are applied.

Briefly, the object of this invention is achieved by mixing certain chemical compounds into the polyethers with which this invention is concerned. Greatly improved adhesion is observed when minor quantities (from about ¼% to about 10%) of certain compounds selected from the class consisting of nitrogen-containing compounds, anhydrides, phenol/aldehydes and urea/aldehydes are mixed with these resins.

In the following examples, steel panels 1" x 4" x ⅛" were thoroughly cleaned by sandblasting and then coated with the chlorinated polyether sold under the trade name "Penton" to which the indicated compounds were mixed. (All percentages are by weight.) In Examples I to IV, the panels were coated in a fluidized bed of the prepared resin by heating the panels for 20 minutes at 600° F., immersing them in the fluidized bed for about 10–20 seconds and then placing them in a postheat oven at 525° F. for about 4 minutes. A smooth continuous film of about 15 to 20 mils was fused uniformly over the surface of the panels.

The comparative degree of adhesion was determined by placing the samples so obtained in boiling water and measuring the time until adhesion had been lost to such an extent that a knife blade could be inserted under the coating and the coating lifted away from the substrate. It was also determined by coating control samples that loss of adhesion normally occurs in 4 hours or less if none of the compounds are mixed with the polyether resin.

*Example I*

0.5% methylene bis(4-phenyl-isocyanate) (trademark "Hylene M" by Du Pont de Nemours & Co.) was added to the polyether resin. Adhesion was lost after 4 hours in boiling water. When 1% and 4% of this additive was included, adhesion was maintained for 20 days.

*Example II*

4% of the bis phenol adduct of the methylene bis(4-phenyl-isocyanate in which the phenol is adducted to block or inactivate the isocyanate groups) (trademark "Hylene MP" by Du Pont de Nemours & Co.) of Example I was added to chlorinated polyether. Adhesion was maintained for 120 days and the test discontinued.

*Example III*

3,3'-dimethoxy-4,4'-biphenylenediisocyanate (DADI) was added to the chlorinated polyether. Good adhesion was maintained for 49 days.

*Example IV*

3,3'-dimethyl-4,4'-biphenylenediisocyanate (TODI) was added to the chlorinated polyether. Good adhesion was maintained for 90 days.

*Example V*

50 parts of finely divided polyether resin (Penton) modified with 3% of the bis phenol adduct of methylene bis(4-phenyl-isocyanate in which the phenol is adducted to block or inactivate the isocyanate groups) (trademark "Hylene MP" by Du Pont de Nemours & Co.) were mixed with 50 parts of a blend of 3 parts by volume trichloroethylene and 1 part by volume of methylene chloride to form a suspension. A similar suspension was prepared with unmodified chlorinated polyether resin.

4" x 1" x ⅛" steel panels were sandblasted to remove all dirt and grease and coated with each of the above suspensions using a spray gun. After the solvent carrier had evaporated, the panels, coated with a loosely adherent layer of powdered material, were baked for 5–10 minutes at 600° F. to fuse the powdered coating into a continuous film. These coatings were evaluated for retention of adhesion using the boiling water test. The unmodified coating lost adhesion in four hours or less. The chlorinated polyether coating modified with 3% of the phenol adduct of methylene bis(4-phenyl-isocyanate) maintained adhesion for 21 days.

I claim:
1. An adherent coating composition comprised of a major portion of a resinous binder of a chlorinated polyether prepared from 3,3-bis(chloromethyl)oxetane having the recurring structure:

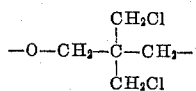

and from about ¼% to about 10% by weight of methylene bis(4-phenylisocyanate).

2. An adherent coating composition comprised of a major portion of a resinous binder of a chlorinated polyether prepared from 3,3-bis(chloromethyl)oxetane having the recurring structure:

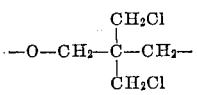

and from about ¼% to about 10% by weight of 3,3'-dimethoxy-4,4'-biphenylenediisocyanate.

3. An adherent coating composition comprised of a major portion of a resinous binder of a chlorinated polyether prepared from 3,3-bis(chloromethyl)oxetane having the recurring structure:

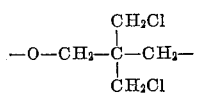

and from about ¼% to about 10% by weight of 3,3'-dimethyl-4,4'-biphenylenediisocyanate.

4. An adherent coating composition comprised of a major portion of a resinous binder of a chlorinated polyether prepared from 3,3-bis(chloromethyl)oxetane having the recurring structure:

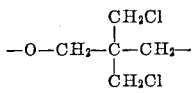

and from about ¼% to about 10% by weight of the bis phenol adduct of methylene bis(4-phenylisocyanate) in which the phenol is adducted to block the isocyanate groups.

References Cited

UNITED STATES PATENTS

| | | | |
|---|---|---|---|
| 2,722,487 | 11/1955 | McTigue | 260—2 |
| 2,950,307 | 8/1960 | France et al. | 260—453 |
| 3,089,783 | 5/1963 | Carlson | 260—2 |

OTHER REFERENCES

"Hylene M. Hylene M–50, Organic Isocyanates," Du Pont Elastomer Chemicals Dept., publication No. HR–5 January 1960.

"Hylene MP, Water Stable Diisocyanate Generator," Du Pont Elastomer Chemicals Dept., publication No. HR–25 (July 1957).

SAMUEL H. BLECH, *Primary Examiner.*